(12) United States Patent
Fouquet

(10) Patent No.: US 6,195,478 B1
(45) Date of Patent: Feb. 27, 2001

(54) PLANAR LIGHTWAVE CIRCUIT-BASED OPTICAL SWITCHES USING MICROMIRRORS IN TRENCHES

(75) Inventor: Julie E. Fouquet, Portola Valley, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/407,542

(22) Filed: Sep. 28, 1999

Related U.S. Application Data

(63) Continuation-in-part of application No. 09/018,772, filed on Feb. 4, 1998, now Pat. No. 5,960,131.

(51) Int. Cl.[7] ............................................. G02B 6/26
(52) U.S. Cl. ........................... 385/17; 385/4; 385/16; 385/18
(58) Field of Search ................................. 385/17, 15–18, 385/122, 49, 4, 14, 5, 8, 1, 129, 22, 27, 43, 50; 430/321; 216/24; 250/201.1

(56) References Cited

U.S. PATENT DOCUMENTS

| | | | |
|---|---|---|---|
| 4,988,157 | 1/1991 | Jackel et al. | 350/96.13 |
| 5,699,462 | 12/1997 | Fouquet et al. | 385/18 |
| 5,960,131 | * 9/1999 | Fouquet et al. | 385/17 |

* cited by examiner

Primary Examiner—Phan T. H. Palmer

(57) ABSTRACT

A planar lightwave circuit (PLC) is formed to include switching elements in which optical coupling among waveguides is determined by positions of displaceable members, such as micromirrors. Each switching element includes at least two light-transmitting waveguides extending along a waveguide substrate to a trench. The optical coupling between the waveguides of a switching element is dependent upon the optical characteristics exhibited at the trench. The displaceable device of a switching element has a transmitting position and a reflecting position. The displaceable device may be manipulated using microelectromechanical system (MEMS) techniques or techniques similar to those used in a dot matrix printer engine. The trench at the crosspoint of waveguides may include a liquid having a refractive index that closely matches the refractive index of the core material of the waveguides. If no index-matching liquid is included at the trench, the walls of the trench are preferably coated with an anti-reflection coating.

20 Claims, 10 Drawing Sheets

PLANAR LIGHTWAVE CIRCUIT-BASED OPTICAL SWITCHES USING MICROMIRRORS IN TRENCHES

CROSS REFERENCE TO RELATED APPLICATION

This application is a continuation-in-part of U.S. patent application Ser. No. 09/018,772, now U.S. Pat. No. 5,960,131 of Fouquet et al., filed Feb. 4, 1998.

TECHNICAL FIELD

The invention relates generally to optical switching elements and more particularly to methods and mechanisms for manipulating optical signals within a switch.

BACKGROUND ART

While signal exchanges within telecommunications networks and data communications networks have traditionally been accomplished by transmitting electrical signals via electrically conductive lines, an alternative medium of data exchange is the transmission of optical signals through optical fibers. U.S. Pat. No. 5,699,462 to Fouquet et al., which is assigned to the assignee of the present invention, describes a switching matrix that may be used for routing optical signals from one of a number of parallel input optical fibers to any one of a number of parallel output optical fibers. A single switching element 10 is shown in FIGS. 1 and 2. Waveguides are fabricated by depositing a lower cladding layer, a core, and an upper cladding layer on a substrate 12. The switching element is shown as including first and second input waveguides 14 and 16 and first and second output waveguides 18 and 20. The core material is primarily silicon dioxide, but with other materials that affect the refractive index of the core. The cladding layers are formed of a material having a refractive index that is substantially lower than that of the core material, so that optical signals are guided along the core material.

A trench 22 is etched through the core material to the silicon substrate in which the cladding layers and core material are formed. The waveguides intersect the trench at an angle of incidence greater than the critical angle of total internal reflection (TIR) when the trench is filled with a vapor or gas. One wall of the trench 22 intersects the crosspoints of the waveguides 14–20. Thus, TIR diverts light from the first input waveguide 14 to the second output waveguide 20, unless an index-matching fluid is located within the gap between the first input waveguide 14 and the first output waveguide 18. The fluid within the trench has a refractive index that substantially matches the refractive index of the core material. An acceptable liquid is a combination of isopropyl alcohol and glycerol. Another acceptable liquid is M-pyrol.

In the embodiment of FIGS. 1 and 2, two microheaters 24 and 26 control the position of a bubble 28 within the fluid-containing trench 22. In the operation of the switching element 10, one of the microheaters is brought to a temperature sufficiently high to form the gas bubble. Once formed, the bubble can be maintained in position with a reduced current to the microheater. In FIG. 1, the bubble is located at the intersection of the core waveguides 14–20. Consequently, an input signal along the first input waveguide 14 will encounter a refractive index mismatch upon reaching the wall of the trench 22. TIR causes the input signals to be diverted to the second output waveguide 20. Thus, the switching element is shown in a reflecting state in FIG. 1. The activation of the microheater 24 pins the bubble at the intersection, so that the reflecting state is maintained as long as the microheater is activated.

In FIG. 2, the microheater 24 at the intersection of the waveguides 14–20 has been deactivated and the second microheater 26 has been activated. The bubble 28 is strongly attracted to the activated microheater. This allows index-matching fluid to fill the gap at the intersection of the waveguides. The switching element is in a transmitting state, since the first input waveguide 14 is optically coupled to the collinear first output waveguide 18. Moreover, the second input waveguide 16 is optically coupled to the collinear second output waveguide 20.

FIGS. 1 and 2 represent only one available approach to manipulating fluid within a trench of a switching element. Other approaches are described in the Fouquet et al. patent. For example, a single heater may be used to vaporize index-matching fluid at the intersections of waveguides in order to toggle a switching element from a reflective state to a transmissive state.

The testing of a switching matrix which utilizes bubble manipulation to control signal paths has yielded very positive results. However, testing for long-term reliability (e.g., 25-year operation) has not been completed, particularly for large scale switching matrices. Consequently, there are still some concerns regarding the bubble-manipulation approach for directing signals in a telecommunications or data communications network. Other types of optical switches are commercially available, but suffer from one or more of cost efficiency, unwieldy size, poor performance, or a known lack of long-term reliability.

What is needed is an optical switching element and a method for fabricating switching matrices that enable optical switching with low insertion loss, low crosstalk, and high scalability, with long-term reliability.

SUMMARY OF THE INVENTION

A switching element for a planar lightwave circuit includes a waveguide substrate in which at least two light-transmitting waveguides are formed of a core layer to extend along the substrate to a trench, so that optical coupling between the waveguides is dependent upon optical characteristics exhibited at the trench. A displaceable member is moved relative to the trench, such that a selected pair of waveguides is optically coupled when the displaceable member is in the first position and the same pair of waveguides is optically isolated when the displaceable member is in the second position. In the preferred embodiment, the displaceable member is the micromirror that is manipulated between the second position (i.e., a non-reflecting position) in which a first input waveguide is optically coupled to a first output waveguide and the first position (i.e., a reflecting position) in which the first input waveguide is optically coupled to a second output waveguide.

In some embodiments of the switching element, there is no liquid within the trench. It follows that the angle of incidence of a waveguide at the wall of the trench must be less than the critical angle required for total internal reflection (TIR). Consequently, an optical signal can enter the trench to be reflected by the micromirror when the micromirror is in the reflecting state. As a result of the ray bending (i.e., refraction) that will occur at the interfaces of the air in the trench and the input and output waveguides, the waveguides that are on opposite sides of the trench should be parallel, with an offset that is calculated using Snell's Law. Unidirectional reflection can be reduced by depositing an anti-reflection coating on the sidewalls of the air-filled trench, so that the resulting switching element is less susceptible to loss and crosstalk. If using two cross-connect switching arrays, one for each polarization component, then the angle of incidence of the waveguides to the trench can be chosen to be Brewster's angle, which in this case would be approximately 34°. This substantially eliminates reflections from the waveguide/air interfaces at trenches which do not contain liquid for one of the two polarizations.

In other embodiments, the trenches are normally filled with liquid. In these embodiments, the angle of incidence of the waveguides to the trenches can assume a large range of values. However, in practice, it is desirable to avoid very large angles of incidence, because large angles tend to lead to long path lengths in the trench. Since an optical signal is not guided as it propagates through the trench, long path lengths lead to higher insertion loss from divergence.

Movement of the mirror between the reflecting and non-reflecting positions may be in the direction perpendicular to the major surfaces of the waveguide substrate. For example, a modified multi-pin dot matrix printer engine may be used. Alternatively, recently available micro-electromechanical system (MEMS) actuators are displaceable in a direction perpendicular to the substrate surfaces and may be used to move the micromirrors. More conventional MEMS actuators may be used to manipulate the mirror in the direction parallel to the axis of the trench. Such actuators can function in the presence of a non-conducting liquid, such as the refractive index-matching fluids used in optical switching elements of the type described with reference to FIGS. 1 and 2. Most current electrostatic actuator technology is limited to approximately a 25 $\mu$m range of motion, which may not be adequate to remove a small mirror from a 32 $\mu$m-long intersection length along the trench for crossing 16 $\mu$m-wide waveguides. Thus, the approach of using electrostatic actuators requires selection of a new kind of actuator having a larger"throw" or requires application of a mirror and actuator combination to fit within a trench intersected by waveguides that are 12.5 $\mu$m wide or less, so that the mirror need not move more than 25 $\mu$m.

Preferably, the waveguides expand as they approach the trench. The expansion is ideally adiabatic. That is, the cross sectional area of the tapering waveguide should change slowly over distance, so that the lowest order local normal mode of the waveguide propagates through the tapering region without a cumulative transfer of power to higher order local normal modes. At the trench, the size of the waveguides is one factor in determining the required throw of the actuator and is one factor in determining the minimal dimensions of the micromirror. Another factor is the angle of incidence of the waveguides to the trench walls, so that fluid-free switching elements may require less translation and smaller micromirrors (since fluid-free elements may have smaller angles of incidence).

DETAILED DESCRIPTION

Figure 1:
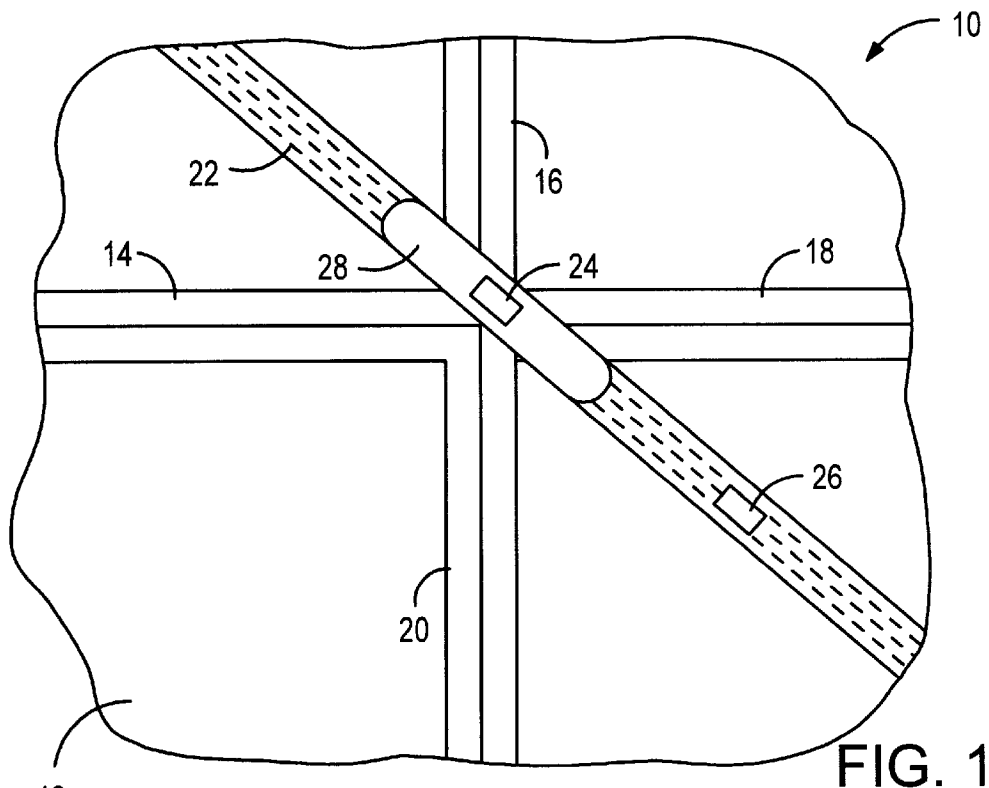
FIG. 1 is a top view of a prior art switching element using bubble manipulation techniques to switch between a reflecting state and a transmitting state, with the switch being shown in the reflecting state.
Figure 2:
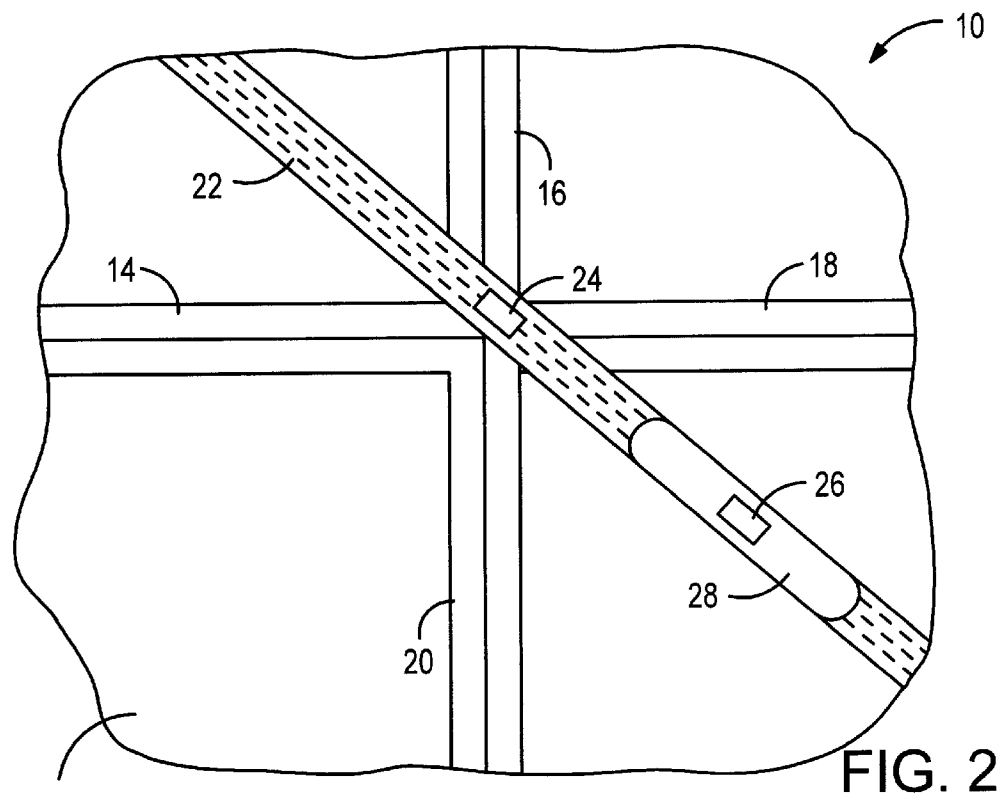
FIG. 2 is a top view of the the switching of FIG. 1 in a transmitting state.
Figure 3:
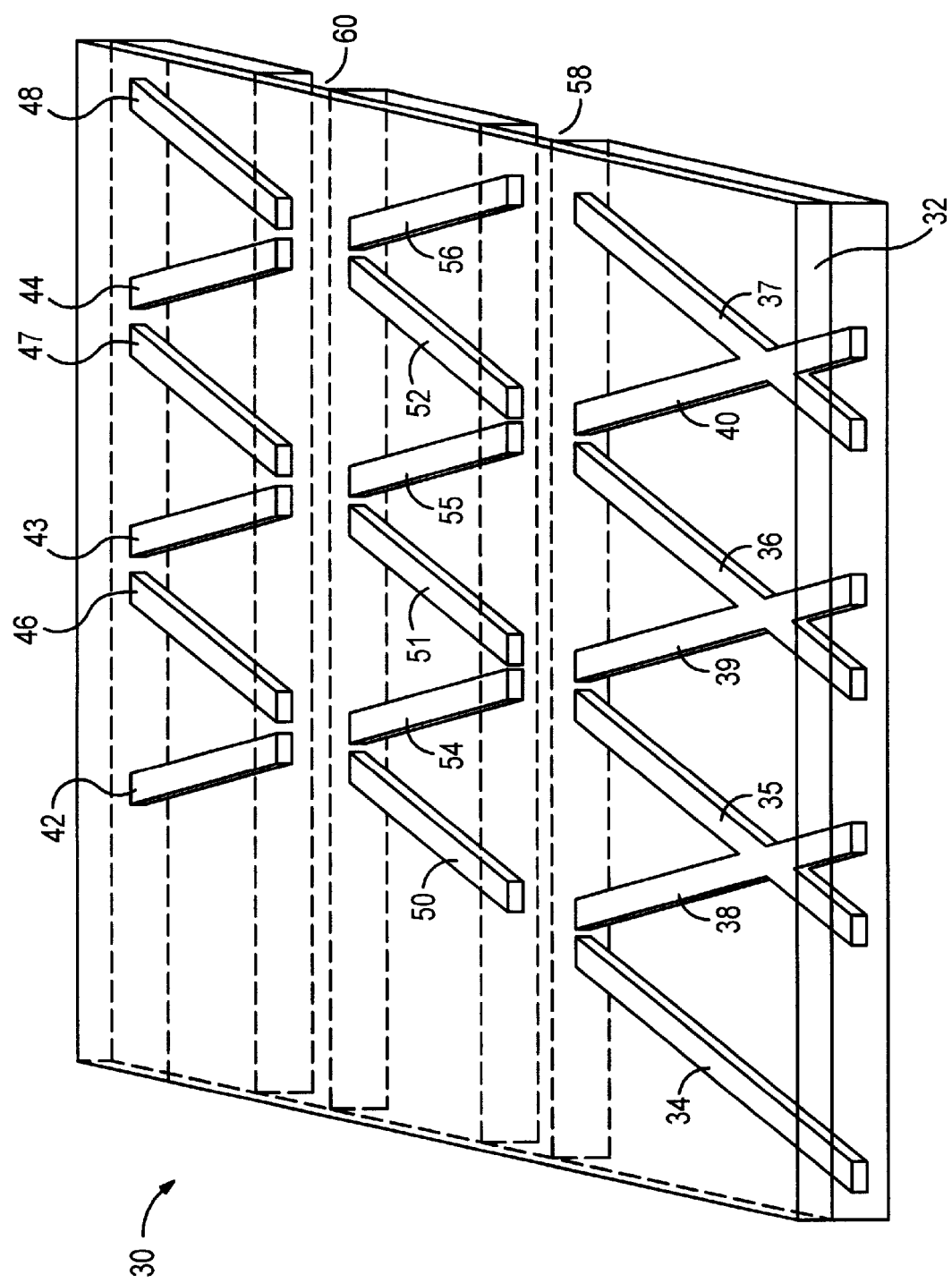
FIG. 3 is a perspective view of a waveguide substrate having trenches to receive displaceable micromirrors in accordance with the invention.

With reference to FIG. 3, a planar lightwave circuit 30 is shown as including a waveguide substrate 32. The waveguide substrate is preferably a silicon chip, but other materials, such as silica, may be used.

At one end of the planar lightwave circuit 30 are four input waveguides 34, 35, 36 and 37. The same side of the circuit includes three output waveguides 38, 39 and 40. Typically, the number of output waveguides will match the number of input waveguides, but FIG. 3 is intended to illustrate the principles of the invention, rather than to illustrate a working model.

At the opposite end of the planar lightwave circuit 30 are three add waveguides 42, 43 and 44 and three drop waveguides 46, 47 and 48. Typically, the number of drop waveguides 46–48 at the far end of the circuit will match the number of input waveguides 34–37 at the near end of the circuit. Likewise, the number of far-end add waveguides 42–44 will typically equal the number of near-end output waveguides 38–40. However, the number of components in the drawing has been reduced in order to facilitate explanation of the circuit. In addition to the waveguides at the ends of the circuits, there are six intermediate input waveguides 50, 51, 52, 54, 55 and 56. Each of the waveguides is formed of a core material, such as $SiO_2$ that is doped with Ge or $TiO_2$ (and possibly $B_2O_3$ and/or $P_2O_5$) to define a first refractive index. While not shown separately in FIG. 3, conventionally there are upper and lower cladding layers that retard the escape of light energy from the waveguides. Cladding material may also be primarily $SiO_2$, possibly with a dopant, such as $B_2O_3$ and/or $P_2O_5$, to define a second refractive index different than the first refractive index. Because of the difference in refractive indices, optical signals are guided along the waveguide cores.

The waveguides of FIG. 3 may be formed using conventional integrated circuit fabrication techniques or flame hydrolysis deposition. The core material is patterned using photolithography or other known approaches. Either during or after the patterning, a pair of trenches 58 and 60 are formed at the crosspoints of the intermediate waveguides 50–56 with near-end and far-end waveguides 34–48. The optical coupling among the waveguides is dependent upon the localized optical characteristics at the crosspoints. For example, an input signal along input waveguide 34 will enter the intermediate waveguide 50 if the localized region between the waveguides 34 and 50 is in a transmissive state. On the other hand, an input signal propagating along the input waveguide 34 will be reflected to the output waveguide 38 if the region at the crosspoint of these waveguides is in a reflecting state. If the localized regions aligned with the input waveguide 34 and the output waveguide 39 are both in transmissive states, but the crosspoint of the intermediate waveguides 50 and 54 is in a reflecting state, a signal that is received via the input waveguide 34 will propagate into the intermediate waveguide 50, be reflected into the intermediate waveguide 54, and exit through the output waveguide 39. Thus, by providing additional levels of intermediate waveguides (i.e., extend waveguides 43 and 46 to a trench that reflects optical signals from the waveguide 46 to the waveguide 43), the signal that is received via the input waveguide 34 can be directed to any one of the three output waveguides 38, 39 and 40.

Increased flexibility in signal manipulation can be achieved by using the add ports 42–44 and the drop ports 46–48 as secondary input ports and output ports, respectively, during times in which the primary input and output ports 34–40 are optically coupled to each other. Thus, when the trench at the junction of intermediate waveguides 50 and 54 is in a reflective state, an optical signal that is introduced at the add port 42 will be reflected and will be directed toward the drop port 46. However, the micromirror that is controlled to determine the transmissive/reflective state at the junctions of waveguides 50 and 54 and waveguides 42 and 46 has a non-zero thickness, so if one side of the micromirror is at the crosspoint of the four waveguides, the other side will be offset from that crosspoint. Since multimode applications are more tolerant of alignment impreciseness, this approach to increasing flexibility is likely to have better results in multimode applications than in single mode applications.

Figure 4:
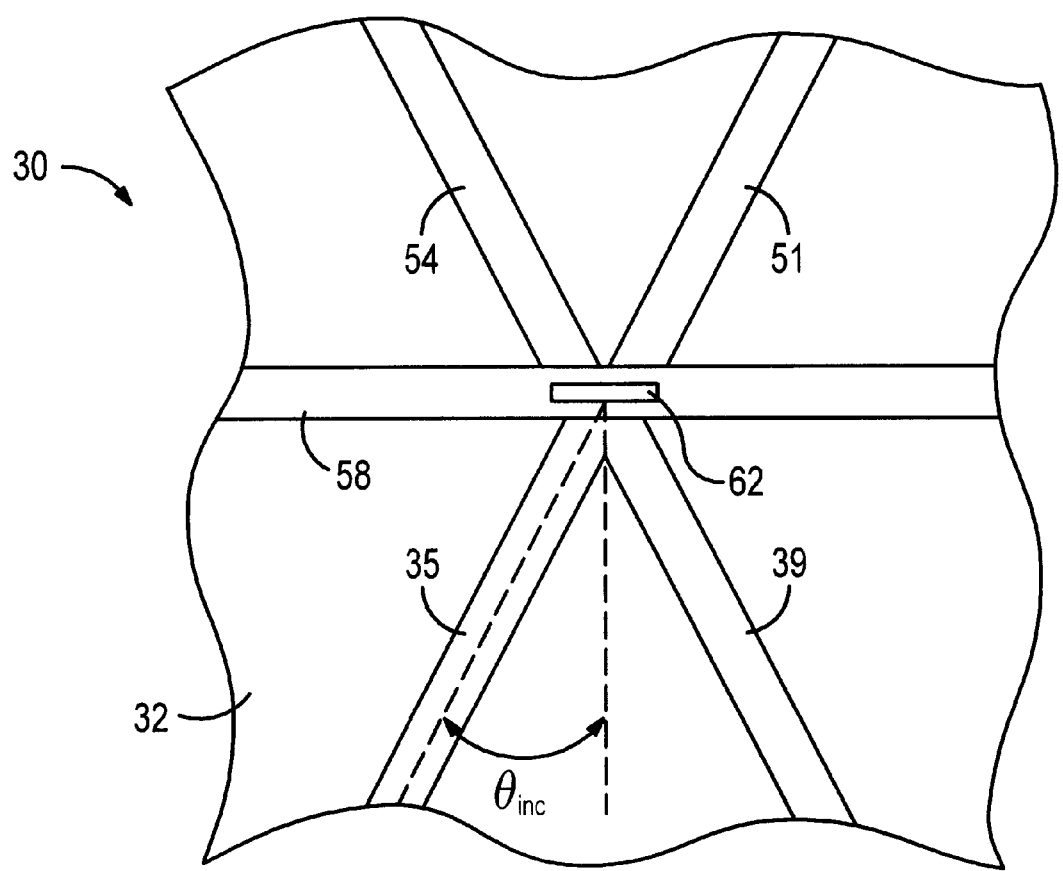
FIG. 4 is a top view of a switching element having a micromirror in a reflecting position.
Figure 5:
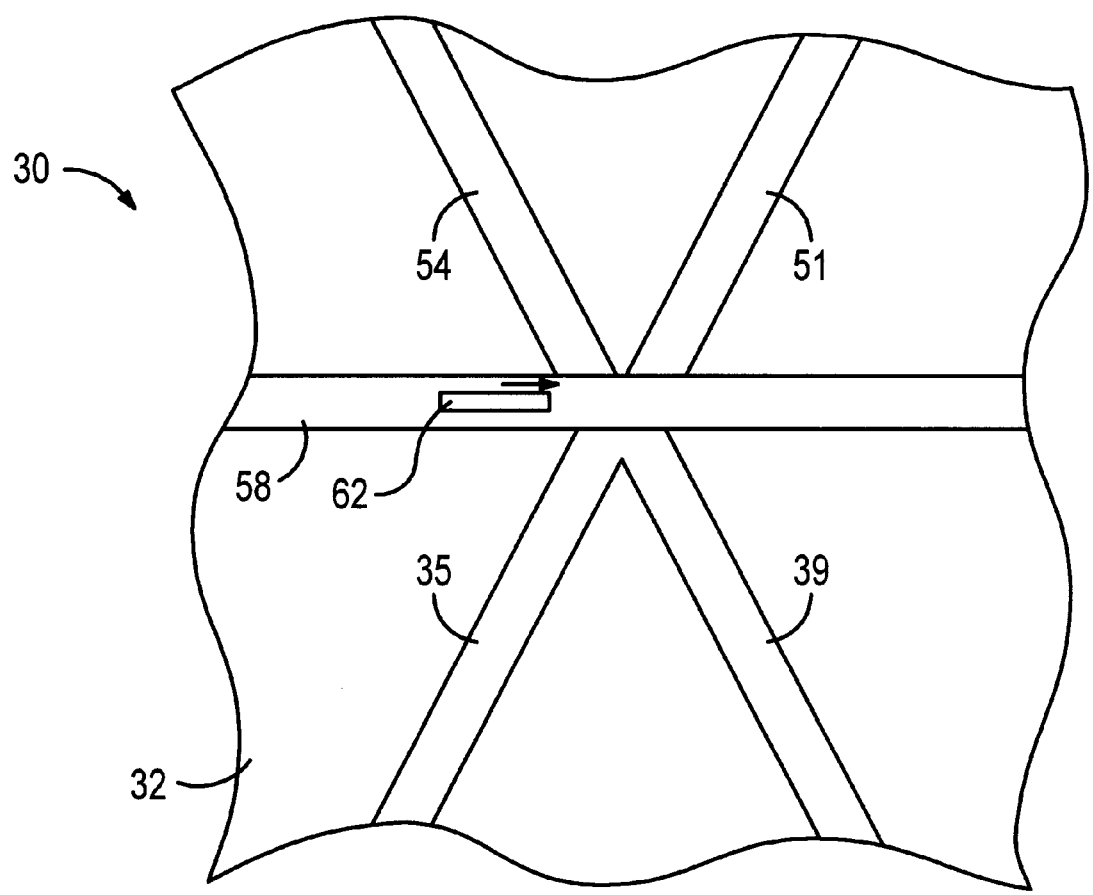
FIG. 5 is a top view of the switching element of FIG. 4 with the micromirror in a transmitting position.

FIGS. 4 and 5 illustrate one embodiment of the invention. In FIG. 4, a displaceable micromirror 62 is shown in a reflecting position, while the same displaceable micromirror is shown in a transmitting position in FIG. 5. In this embodiment, the micromirror slides along the trench 58. However, preferred embodiments will be described below. In the reflecting position of FIG. 4, an input signal along the input waveguide 35 will enter the trench 58 and be reflected at the surface of the micromirror 62. The reflected optical signal will enter the output waveguide 39. On the other hand, with the micromirror in the transmitting position of FIG. 5, the input signal propagates into the trench 58 and exits via the intermediate waveguide 51. Consequently, by manipulating the micromirror, the direction of the optical signal can be switched.

There are two versions of each of the embodiments that will be described herein. In a first version, the trenches are free of fluid-matching liquid. In the second version, each trench is filled with a fluid having a refractive index similar to the refractive index of the core material used to form the waveguides 35, 39, 51 and 54. An acceptable liquid is a combination of isopropyl alcohol and glycerol. Another acceptable liquid is M-pyrol. If the trench 58 of FIG. 4 is free of index-matching liquid, the angle of incidence of the waveguides 35, 39, 51 and 54 on the walls of the trench 58 must be less than the critical angle required for total internal reflection (TIR). With an incidence angle less than that required for TIR, an input optical signal will enter into the trench 58 to be reflected by the mirror 62 or will pass through the opposite walls of the trench, if the micromirror is in the transmitting state of FIG. 5. As a result of ray bending (i.e., refraction), at the interfaces of the air in the trench and the waveguides, the waveguides that are on opposite sides of the trench should be slightly misaligned, as shown in FIGS. 4 and 5. The required displacement can be calculated using Snell's Law $n_1 \sin \theta_{inc1} = n_2 \sin \theta^{inc2}$.

Undesired reflections can be reduced by depositing an anti-reflection coating on the sidewalls of the air-filled trench, so that the resulting switching element is less susceptible to loss and crosstalk. As is well known in the art, anti-reflection coatings provide a controlled transition between the refractive characteristics of the waveguide material and the refractive characteristics of the atmosphere within the trench. If using two cross-connected switching arrays, one for each polarization component, and the initial polarization component is rotated, then the angle of incidence of the waveguides to the trench can be chosen to be Brewster's angle, which in this case would be approximately 34°. This substantially eliminates reflection from the waveguide/air interfaces at trenches which do not contain index-matching liquid, and no anti-reflection coating is needed.

In the versions in which the trenches 58 are normally filled with index-matching liquid, the angle of incidence of the waveguides to the trenches can assume a large range of values. However, in practice, it is desirable to avoid very large angles, because large angles of incidence tend to lead to long path lengths in the trench. Since optical signals are not guided as they propagate through the trench, long path lengths lead to higher insertion losses from divergence.

In the embodiment of FIGS. 4 and 5, the micromirror 62 moves parallel to the major surface of the substrate 32 on which the waveguides 35, 39, 51 and 54 are fabricated. The sliding motion may be achieved using MEMS actuators. Such actuators can function in the presence of nonconducting liquid, such as the refractive index-matching liquids identified above. However, many currently available electrostatic actuators are limited to a range of motion of approximately 25 $\mu$m, which may not be adequate to remove the mirror from a $\leq$32 $\mu$m-long intersection length along the trench for crossing waveguides having a width of 16 $\mu$m. Thus, the sliding-motion approach of using electrostatic actuators may require selection of an actuator having an improved "throw" or requires application of a micromirror-and-actuator combination to fit in a trench in which the waveguides are 12.5 $\mu$m wide or less, so that the micromirror does not need to move more than 25 $\mu$m. However, as will be described below with reference to FIG. 11, there are advantages to having a wide waveguide, at least at the waveguide/trench interface.

Figure 6:
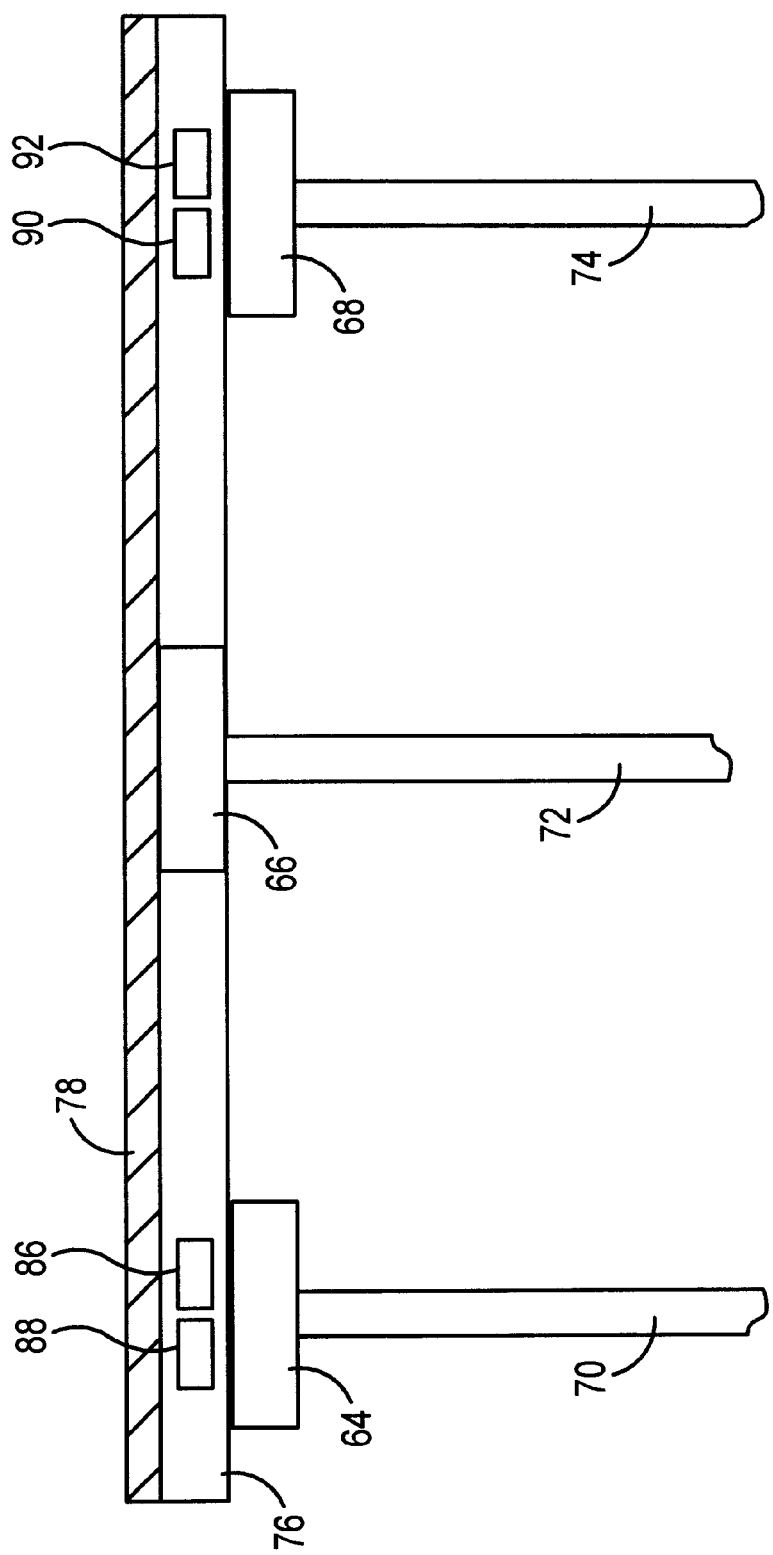
FIG. 6 is a side view of an array of micromirrors that are displaced perpendicular to switching areas in accordance with one embodiment of the invention.
Figure 7:
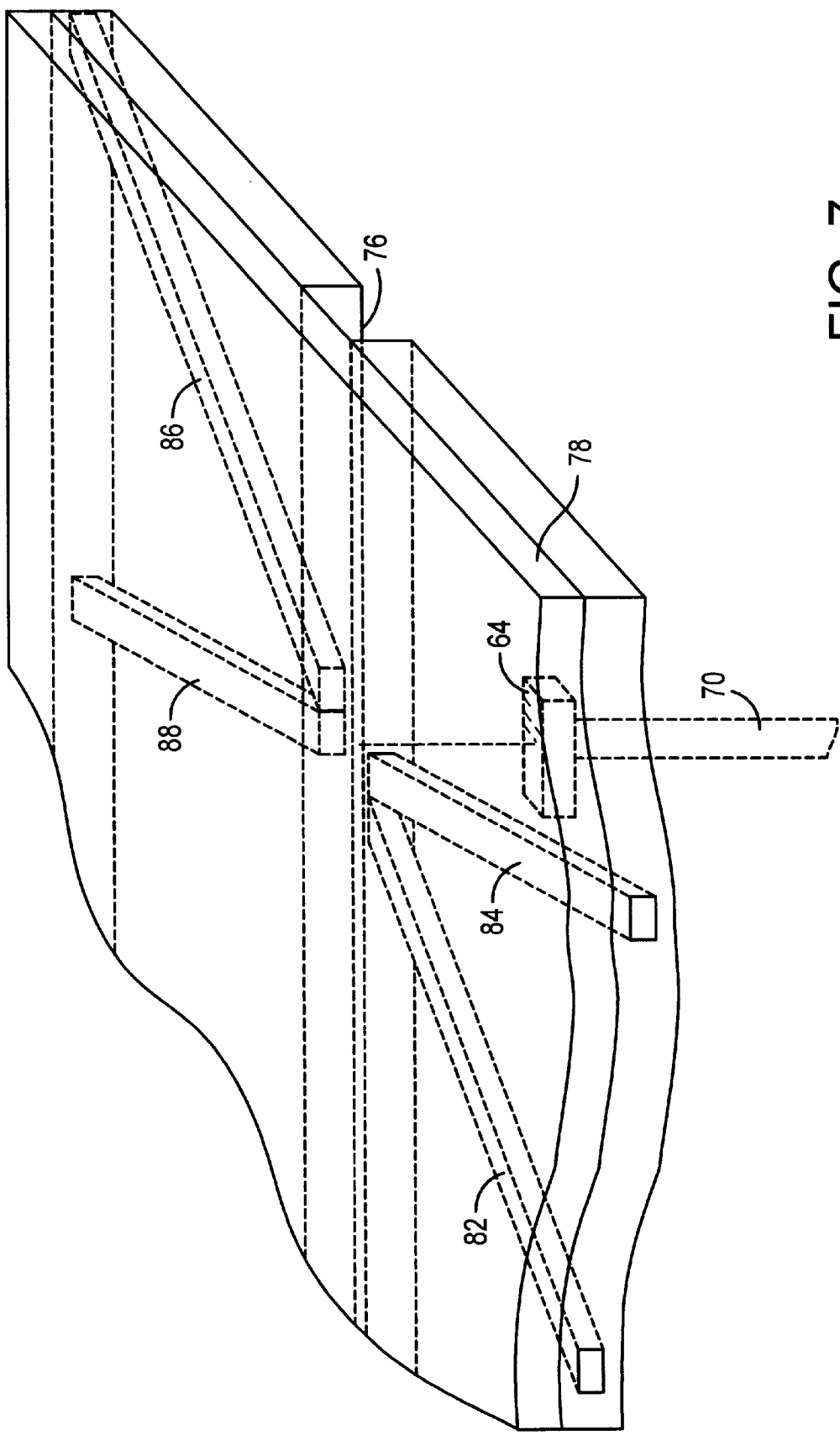
FIG. 7 is a perspective view of one of the switching elements of FIG. 6.

As an alternative to the sliding motion of the micromirror, an embodiment of FIGS. 6 and 7 utilizes micromirror motion perpendicular to the major surfaces of the substrate on which the waveguides are fabricated. A possible implementation is to utilize a modified multi-pin dot matrix printer engine. In FIG. 6, three micromirrors 64, 66 and 68 have positions that are determined by independent manipulation of the pins 70, 72 and 74. The first and third micromirrors 64 and 68 are shown in the lowered, transmitting position. On the other hand, the center micromirror 66 has been raised to the reflecting position. In the reflecting position, the micromirror 66 extends into a trench 76 along the lower surface of a waveguide substrate 78. Because the micromirror 66 is at the same level as input and output waveguides, an optical signal propagating along an input waveguide will be reflected at the surface of the micromirror. The reflected energy will enter a properly aligned output waveguide that is on the same side as the input waveguide.

Referring specifically to FIG. 7, the lowered micromirror 64 is out of alignment with the crosspoint of an input waveguide 82 and an output waveguide 84. As a result, an optical signal that is propagating along the input waveguide will enter the trench 76 and will exit the trench via a drop waveguide 86. Similarly, if an optical signal is propagating along an add waveguide 88, the signal will enter the output waveguide 84. When the pin 70 is moved upwardly to place the micromirror 64 into the trench 76, the input signal along the input waveguide 82 will be reflected at the surface of the micromirror 64 and will enter the output waveguide 84. Returning to FIG. 6, above the opposite end micromirror 68 are waveguides 90 and 92. The waveguide 90 is the functional equivalent of the add waveguide 88 of FIGS. 6 and 7, while the waveguide 92 is the functional equivalent of the drop waveguide 86.

The pin spacing for conventional multi-pin dot matrix printer engines is typically greater than the preferred spacing between the switching elements of FIG. 6. A pitch of 250 $\mu$m may be the preferred spacing between adjacent waveguides. Thus, a specially designed multi-pin engine may be utilized, or the pitch of the switching elements may be expanded.

While the illustrations of the embodiments of FIGS. 4–9 have not included the substrates on which actuators are fabricated and/or controlled, typically an actuator substrate is connected to a waveguide substrate using conventional techniques. The coupling of the two substrates provides a means for enclosing the trenches when an index-matching liquid is to be captured within the trenches.

Figure 8:
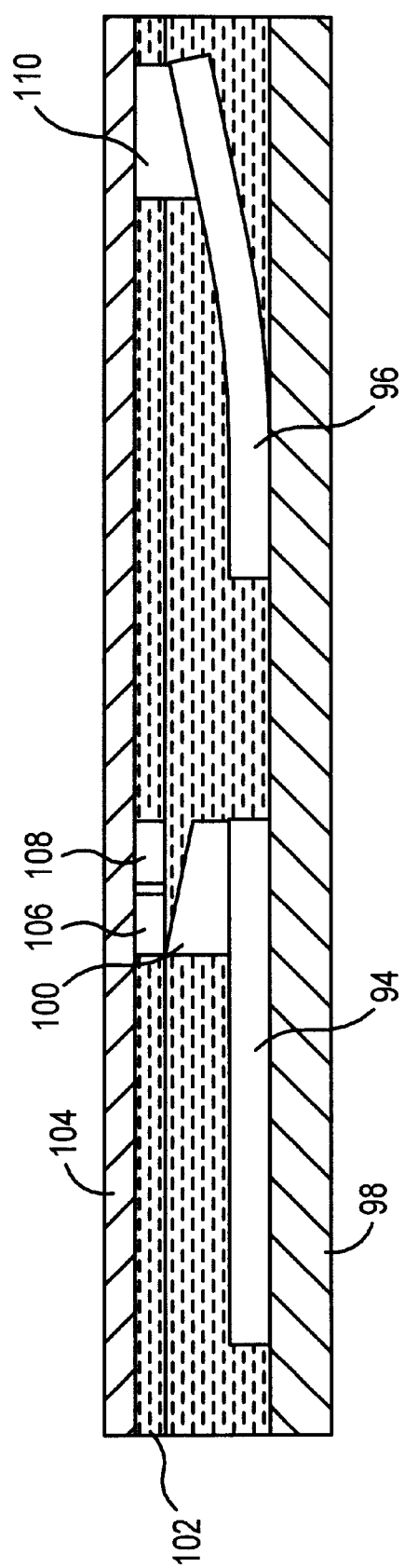
FIG. 8 is a side sectional view of two switching elements in which a micromirror is displaced by a MEMS actuator in accordance with another embodiment of the invention.

Another embodiment of the invention is illustrated in FIG. 8. In this embodiment, the actuators 94 and 96 employ the bending technology that employs stress-induced curling and electrostatic actuation. The actuators are formed on an actuator substrate 98. An acceptable mechanism of the stress-induced curling and electrostatic actuation embodiment is the one recently disclosed by Ming Wu et al. in "Optical Fiber Communications Conference," February, 1999. The resulting switches have adequate throw (i.e., move a sufficiently large distance between the reflecting position and the transmitting position) to move fully into and out of the optical signal traveling through a planar lightwave circuit. The Wu et al. actuators are described with reference to free-space applications. The concern is that in the free-space configuration, scalability is a difficult issue, as a result of divergence. For example, if a Gaussian optical beam is fit within a micromirror Which has a smaller dimension (d) of 175 $\mu$m, then the starting spot size $w_s$ must be $w_s$ =d/2 =87.5 $\mu$m. To achieve the longest propagation distance, launching optics should focus to a spot size of $w_o=w_s/\sqrt{2}=61.9$ $\mu$m located halfway along the longest path. Then, the optical signal can propagate over twice the Rayleigh range $Z_R=\pi W_o^2/\lambda=0.78$ cm for the longest path. If the micromirror spacing is 0.1 cm, the switch array can be seven or eight units in each direction, leading to a maximum size of 8 ×8, if low optical losses are required. While larger switches can be fabricated with higher loss (and higher crosstalk due to beams spilling over mirrors), high optical performance is required for the majority of applications (telecommunications and test/measurement) under consideration. Even if larger mirrors are constructed, the larger beams that will be used will require extremely tight angular control in order to keep losses low. However, by using planar lightwave circuits as described herein, the optical path lengths over which divergence occurs will be much shorter per crosspoint (e.g., 10 $\mu$m, as opposed to 1 mm), and thus much larger switches can be constructed.

In FIG. 8, the first actuator 94 is shown in the relaxed state in which a micromirror 100 is outside of a trench 102 of a waveguide substrate 104. With the micromirror 100 outside of the trench 102, optical signals are free to propagate through the trench, as indicated by the exposed waveguides 106 and 108. On the other hand, the second actuator 96 has been actuated and the stress-induced curling results in a micromirror 110 being moved into the trench 102. While not shown, the micromirror 110 is in a position to reflect optical signals from a first input waveguide into an output waveguide. When the second actuator 96 is relaxed, the micromirror 110 will move out of the trench and propagation through the trench will be enabled.

In order to construct a cross-connect matrix using planar lightwave circuits and actuators of the type described by Wu et al., the waveguide substrate 104 and the actuator substrate 98 must be precisely aligned and positioned. Optical fiber and/or ball lenses can be placed in grooves and/or holes wet-etched in silicon. Complementary slots can be etched in the waveguide substrate during the etching step for forming the trench 102. These features can then be used as registration elements.

The micromirrors 100 and 110 are configured such that the upper mirror surfaces may contact the surface of the waveguide substrate 104 when the actuators place the mirrors in the reflecting position, as shown by the micromirror 110. The version of the planar waveguide circuit illustrated in FIG. 8 includes index-matching liquid within the trench 102 and within the region between the two substrates 98 and 104. However, the actuators 94 and 96 may be used in applications in which there is no index-matching liquid.

Figure 9:
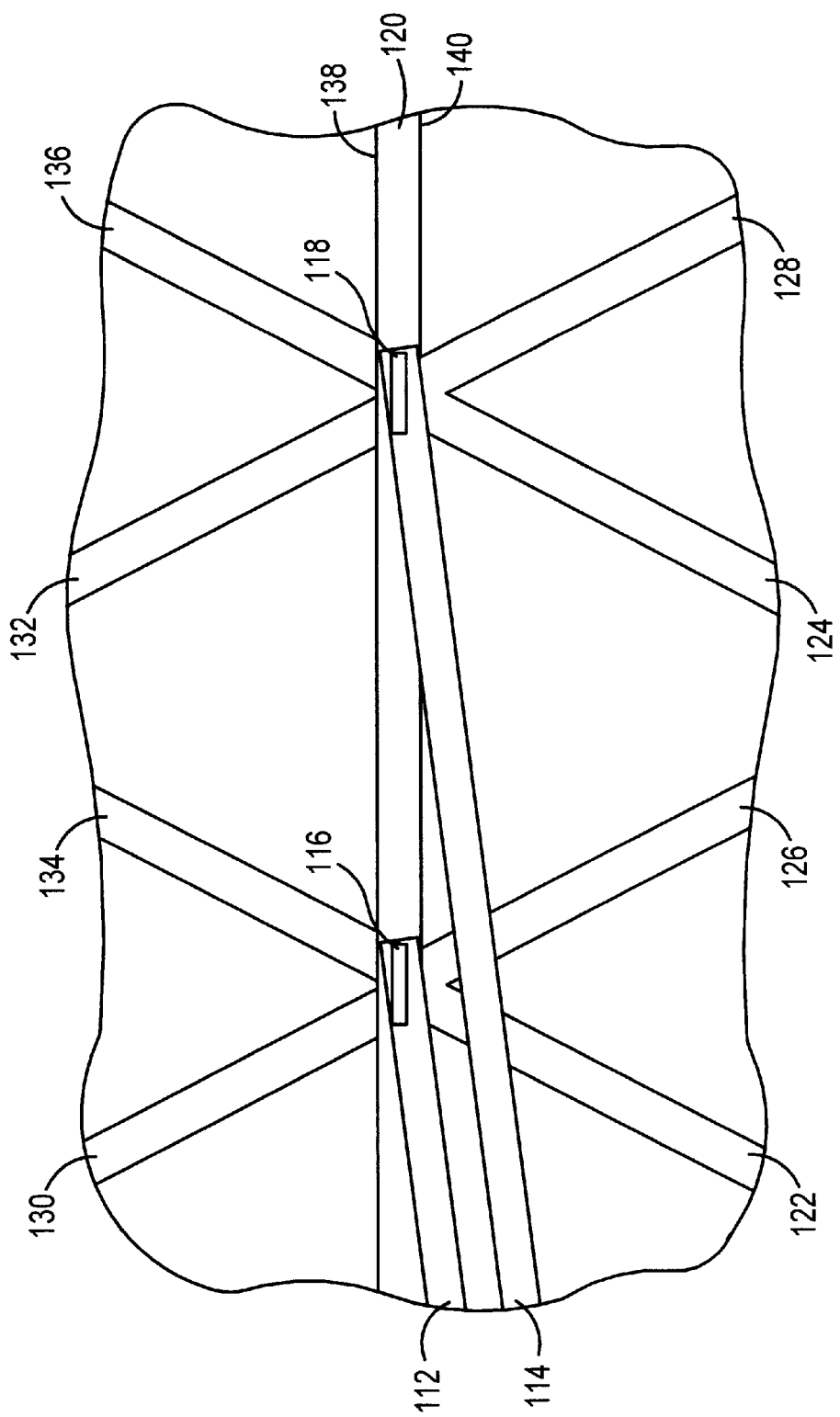
FIG. 9 is a bottom view of another embodiment of MEMS actuators in accordance with the invention.

If the actuators 94 and 96 are too large to accommodate the desired pitch (e.g., a desired 250 $\mu$m actuator pitch to match the fiber pitch of a fiber ribbon cable), it is possible to tilt the actuator layout relative to the trenches, as indicated in FIG. 9. Two actuators 112 and 114 control the position of micromirrors 116 and 118 relative to a trench 120. The micromirrors move into and out of the trench 120 as the actuators are curled and straightened. The micromirrors are positioned at crosspoints of input waveguides 122 and 124 with output waveguides 126 and 128. On the opposite side of the trench 120 are add waveguides 130 and 132 and drop waveguides 134 and 136. In the version shown in FIG. 9, there is no index-matching liquid within the trench 120. Consequently, the vertical walls 138 and 140 of the trench are preferably coated with an anti-reflection coating.

When the micromirror 116 is in the transmitting position in which the micromirror is removed from the crosspoint of waveguides 122 and 126, the input waveguide 122 is optically coupled to the drop waveguide 134. Moreover, the add waveguide 130 is optically coupled to the output waveguide 126. Subsequently, by curling the actuator arm 112, the micromirror 116 is displaced to its reflecting position at the crosspoint of the waveguides 122 and 126. An input signal propagating along the input waveguide 122 will be reflected at the surface of the micromirror 116 and will exit via the output waveguide 126.

Figure 10:
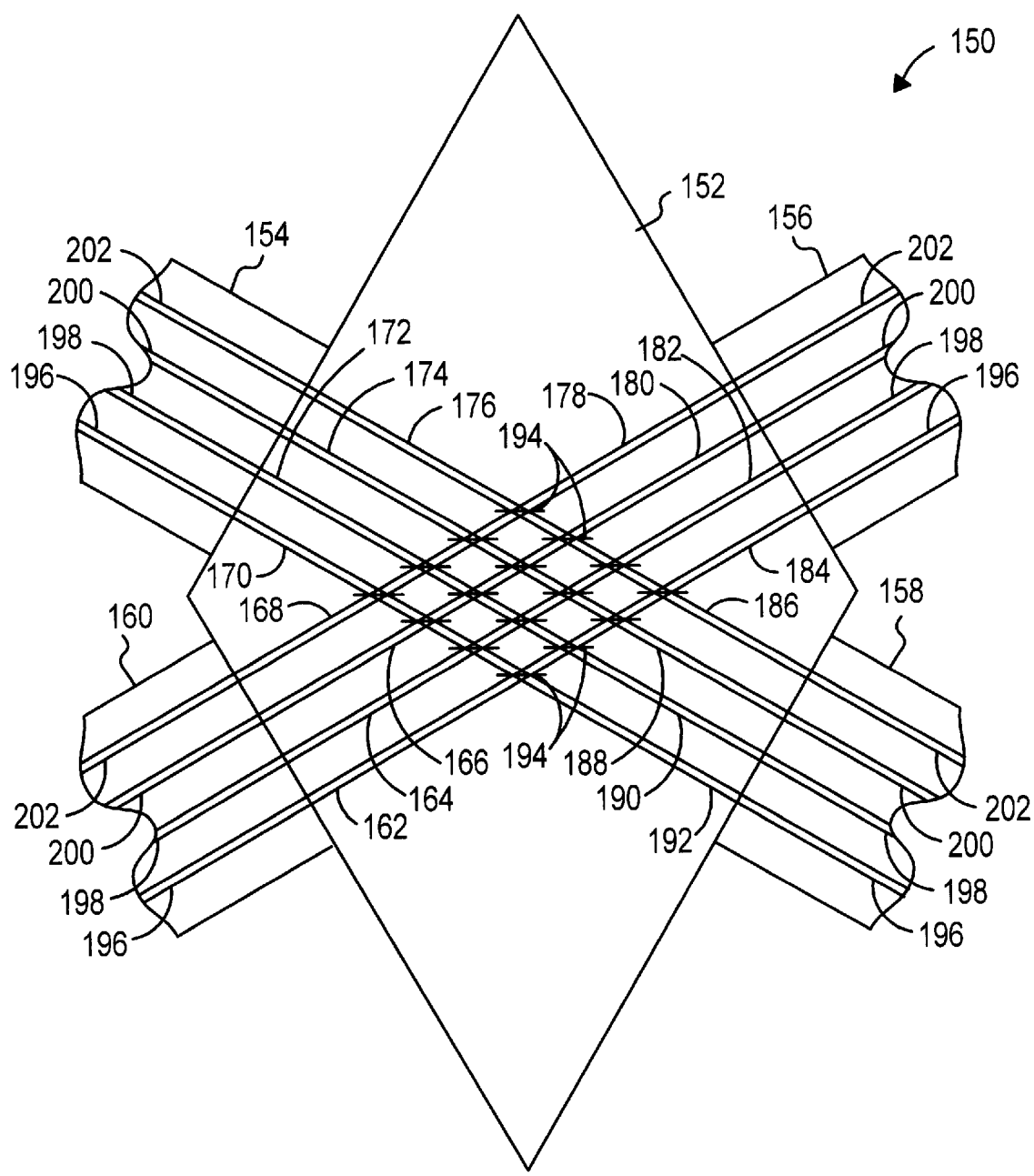
FIG. 10 is a top view of a matrix of switching elements in accordance with the invention.

FIG. 10 illustrates a waveguide substrate 152 that is attached to four fiber array substrates 154, 156, 158 and 160. While not shown in the top view of FIG. 10, the interfaces between the waveguide substrate and each fiber array substrate can be intentionally tilted at an angle that is intended to decrease the magnitude of reflection between the waveguides on the substrate 152 and the optical fibers on the substrates 154, 156, 158 and 160. The actuator substrate that includes the micromirrors is not illustrated in FIG. 10.

The waveguide substrate 152 includes four input waveguides 162, 164, 166 and 168, four add waveguides 170, 172, 174 and 176, four drop waveguides 178, 180, 182 and 184, and four output waveguides 186, 188, 190 and 192. Additionally, there are twenty-four intermediate waveguides to increase the flexibility of the switching arrangement. In order to optically couple the input waveguide 162 to the drop waveguide 184, an optical signal must pass through three intermediate waveguides and four trenches that are between adjacent waveguides. The trenches are represented by lines 194 at the waveguide intersections and may be implementations of any of the embodiments described above.

If the waveguide substrate 152 is coupled to an actuator substrate and lowermost trench 194 in FIG. 10 includes a micromirror in its reflecting position, any input signals from the waveguide 162 will be diverted by total internal reflection to the output waveguide 192. On the other hand, if the micromirror for the lowermost trench is in its transmitting position, the optical signal from waveguide 162 will propagate through the trench to the next trench. Depending upon the positions of four micromirrors that are aligned with the input waveguide 162, the input signal from waveguide 162 may be diverted into any one of four output waveguides 186, 188, 190 and 192. This versatility applies to the other three input waveguides 164, 166 and 168 that are adjacent to waveguide 162.

Each of the four fiber array substrates 154, 156, 158 and 160 includes four optical fibers 196, 198, 200 and 202. An acceptable pitch is approximately 250 µm, but other center-to-center distances may be utilized, such as 500 µm.

Figure 11:
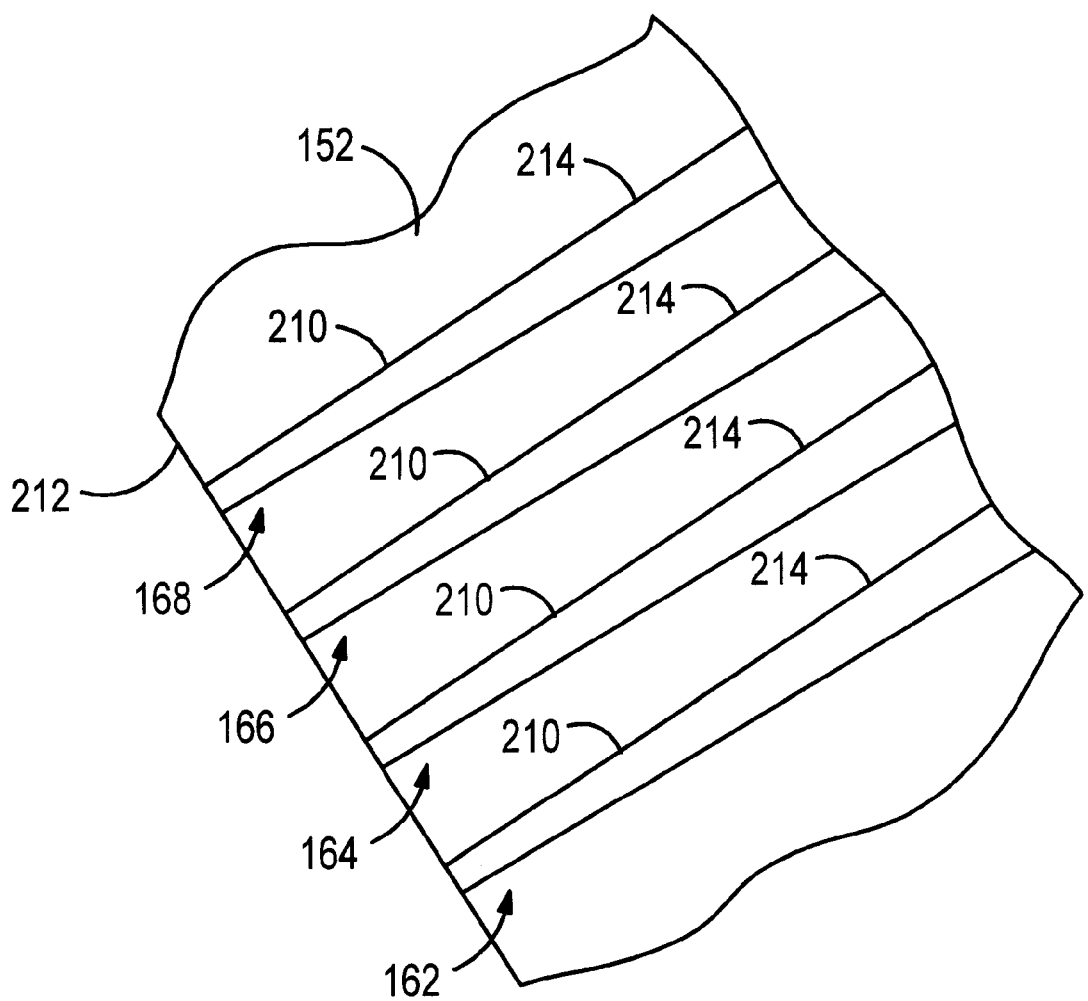
FIG. 11 is a top view of tapering portions of waveguides of FIG. 10.

Preferably, the waveguides 162–192 are adiabatically tapered from a relatively large cross sectional area at the interfaces with the trenches 194 to a relatively small cross sectional area at the interfaces with the optical fibers 196–202. The cross sectional geometry of the waveguides at the trenches is selected to achieve efficient optical coupling across the trenches. On the other hand, the cross sectional geometry at the interfaces with the optical fibers is selected to achieve high coupling efficiency to the optical fibers. In one embodiment, the adiabatic tapering is from a 16 µm wide×8 µm high waveguide core cross sectional geometry to an 8 µm square cross sectional geometry. However, other embodiments are contemplated. The adiabatic tapering is shown in FIG. 11. Each of the four waveguide cores 162–168 includes a tapering region 210 in which the sidewalls of the waveguide core diverge with distance from an edge 212 of the waveguide substrate 152. Each waveguide core also includes an interior region 214 in which the sidewalls are parallel. Optionally, the region of each waveguide core proximate to the edge 212 also has parallel sidewalls, so that the tapering region 210 is an intermediate region between the two constant-width regions.

An advantage of the adiabatically expanding waveguide cores of the planar lightwave circuit is that transmission losses across the trenches are reduced. However, the angular alignment requirements involved in forming the planar lightwave circuit are tightened. If in practice it is determined that it is more difficult to achieve desired angular alignment (probably within 1°) than positional alignment (probably roughly within 1 µm in the direction perpendicular to the trench sidewall), it may be preferential to use non-expanding cores.

What is claimed is:

1. A switching element comprising:
    a waveguide substrate;
    first and second light-transmitting waveguides formed of a core and cladding layers extending along said waveguide substrate to a trench and being positioned such that optical coupling between said first and second waveguides is dependent upon optical characteristics exhibited at said trench;
    a displaceable device having a first position and a second position relative to said trench, said first and second waveguides being optically coupled when said displaceable device is in said second position and being substantially optically isolated when said displaceable device is in said first position; and
    means for manipulating said displaceable device between said first position and said second position.

2. The switching element of claim 1 further comprising a third light-transmitting waveguide formed of said core layer on said waveguide substrate, said third waveguide intersecting said trench on a side of said trench opposite to said first waveguide such that said first and third waveguides are optically coupled when said displaceable device is in said first position.

3. The switching element of claim 1 wherein said displaceable device is a micromachined mirror.

4. The switching element of claim 3 wherein said means for manipulating is a micro-electromechanical system (MEMS).

5. The switching element of claim 3 wherein said micromachined mirror is controlled by said means for manipulating to have sufficient movement such that said first position is within said trench and said second position is outside of said trench.

6. The switching element of claim 3 wherein said micromachined mirror is controlled by said means for manipulating to slide within said trench between said first and second positions, such that said micromachined mirror remains in said trench.

7. The switching element of claim 1 further comprising first and second optical fibers aligned with said substrate to be optically coupled to said first and second waveguides, respectively.

8. The switching element of claim 1 further comprising an actuator substrate connected to said waveguide substrate, said means for manipulating being a micromachined mechanism formed on said actuator substrate.

9. The switching element of claim 1 further comprising fluid within said trench, said fluid having an index of refraction similar to an index of refraction of said first and second waveguides.

10. The switching element of claim 1 further comprising an antireflection coating at interfaces of said trench with said first and second waveguides.

11. An optical routing matrix comprising:
    a waveguide substrate having at least one trench along a surface of said waveguide substrate;
    an array of optical crosspoints at said at least one trench, said optical crosspoints being defined by a plurality of waveguides extending along said surface of said waveguide substrate to form a planar lightwave circuit, each optical crosspoint being substantially at an optical intersection of an input waveguide with first and second waveguides that are on opposite sides of a corresponding trench; and
    a plurality of solid actuators positioned to correspond to said optical crosspoints, each actuator having a reflecting position in which a corresponding one of said input waveguides is optically coupled to a corresponding said second waveguide, each actuator further having a non-reflecting position in which said corresponding one of said input waveguides is optically coupled to a corresponding said first waveguide.

12. The matrix of claim 11 wherein said actuators are micromachined members having micromirrors.

13. The matrix of claim 12 wherein each said micromirror is manipulated by one of said micromachined members to shift between said reflecting position within one of said trenches and said non-reflecting position outside of said trenches.

14. The matrix of claim 12 wherein each said micromirror is manipulated by one of said micromachined members to slide within one of said trenches.

15. The matrix of claim 11 further comprising a liquid within each said trench, said liquid having a refractive index similar to a reflective index of the material that forms said waveguides.

16. A method of routing optical signals comprising steps of:

forming a plurality of light-transmitting waveguides on a waveguide substrate, including forming a trench at a crosspoint of said waveguides such that optical coupling of an input waveguide to spaced apart first and second waveguides is dependent upon optical characteristics at said crosspoints;

providing a micromirror that is displaceable between a first position and a second position; and switching said optical coupling of said input waveguide by manipulating said micromirror, including displacing said micromirror to said first position at said crosspoint to optically couple said input waveguide to said second waveguide, and further including removing said micromirror from said crosspoint to optically couple said input waveguide to said first waveguide.

17. The method of claim 16 wherein said step of switching includes using mirror-displacement techniques equivalent to techniques used to manipulate print members in a dot matrix printer engine.

18. The method of claim 16 wherein said step of switching includes using a MEMS actuator.

19. The method of claim 18 wherein said step of switching includes sliding said micromirror within said trench.

20. The method of claim 16 further comprising filling said trench with a liquid.

* * * * *